UNITED STATES PATENT OFFICE.

MARTIN HANKEL, OF OFFENBACH-ON-THE-MAIN, GERMANY, ASSIGNOR TO THE CORPORATION OF CHEMISCHE FABRIK GRIESHEIM-ELEKTRON, OF FRANKFORT-ON-THE-MAIN, GERMANY.

PROCESS FOR THE MANUFACTURE OF ALKALI SALTS OF NITROSAMINS OF PRIMARY AROMATIC AMINS.

1,200,726.   Specification of Letters Patent.   Patented Oct. 10, 1916.

No Drawing.   Application filed December 3, 1915.   Serial No. 64,836.

*To all whom it may concern:*

Be it known that I, MARTIN HANKEL, citizen of the German Empire, and resident of Offenbach-on-the-Main, in the Grand Duchy of Hesse, Germany, (with the post-office address Mainstrasse 189,) have invented new and useful Improvements in Processes for the Manufacture of Alkali Salts of Nitrosamins of Primary Aromatic Amins, of which the following is a specification.

My invention relates to the manufacture of alkali salts of nitrosamins of primary aromatic amins. I have found that these alkali-salts of nitrosamins may be obtained in an advantageous manner by allowing caustic alkalis to act on the arylsulfonates of corresponding diazo compounds in separated concentrated form. The caustic alkalis may be used in solution of any degree of concentration and this concentration may be driven higher than is possible in any other case. The use of the arylsulfonates of the diazo compounds in separated concentrated form makes it possible to consume less alkali than is possible in the previous mode of working, so that the new process constitutes a considerable technical advance.

The following examples illustrate the invention:

1. 100 kilos of ortho-dianisidin are tetrazotized in the usual manner and stirred with about 180 kilos of sodium naphthalene-1:5-disulfonate. The precipitate produced is pressed and carefully dried. 30 kilos of this dimethoxydiphenyl-tetrazosulfonate (corresponding with about 33 per cent. of dianisidin) are ground together with a suitable quantity, say 19 kilos of powered caustic soda (about 1.92 parts of NaOH to 1 part of dianisidin). While continuously working the mixture and cooling it, 4.7 liters of water (or the corresponding quantity of caustic soda lye) are allowed to drop gradually thereinto. The mass is then heated until a sample dissolved in water no longer gives a dyestuff on addition of β-naphthol. After cooling the nitrosamin is obtained directly in the form of a dry chocolate brown powder.

2. Benzidin is tetrazotized as usual, a precipitate is produced by adding naphthalene-1:5-disulfonic acid and this precipitate is filtered and dried. 30 kilos of the tetrazodiphenyl-sulfonate (corresponding with about 29 per cent. of benzidin) are ground with 31 kilos of caustic soda and while the mixture is well worked 7.8 liters of water (or the corresponding quantity of caustic soda lye) are added to it by drops. The mixture is then heated until the diazo-reaction disappears. After cooling, the nitrosamin is obtained as a dry powder.

3. 3-nitro-4-amino-1-methyl-benzene is diazotized and precipitated by addition of naphthalene-1:5-disulfonic acid. The sulfonate, in moist or dry form, is introduced into caustic soda lye of suitable concentration. The nitrosamin is produced at once and is separated by filtration, in some cases after salting out.

Instead of diazo-1:5-naphthalene-disulfonate the diazo salts of other sulfonic acids of the benzene or naphthalene series may be used, provided they are sufficiently sparingly soluble, or can be salted out.

With other diazo compounds the process may be conducted in corresponding manner.

Now what I claim and desire to secure by Letters Patent is the following:

Process for the manufacture of alkali salts of nitrosamins of primary aromatic amins, consisting in allowing caustic alkalis to act on arylsulfonates of the corresponding diazo compounds in separated concentrated form substantially as described.

That I claim the foregoing as my invention, I have signed my name in presence of two witnesses, this fifth day of November, 1915.

MARTIN HANKEL.

Witnesses:
ANTON FALLER,
JEAN FRICKEL.